(12) United States Patent
Nania (10) Patent No.: US 10,272,747 B2
(45) Date of Patent: Apr. 30, 2019

(54) CONVERTIBLE DOOR ASSEMBLY FOR A MOTOR VEHICLE

(71) Applicant: FORD GLOBAL TECHNOLOGIES, LLC, Dearborn, MI (US)

(72) Inventor: Adrian Nania, Rochester, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 29 days.

(21) Appl. No.: 15/717,454

(22) Filed: Sep. 27, 2017

(65) Prior Publication Data

US 2019/0092146 A1 Mar. 28, 2019

(51) Int. Cl.
*B60J 5/00* (2006.01)
*B60J 5/04* (2006.01)

(52) U.S. Cl.
CPC ......... *B60J 5/0476* (2013.01); *B60J 5/0406* (2013.01); *B60J 5/0408* (2013.01); *B60J 5/0412* (2013.01)

(58) Field of Classification Search
CPC ...... B60J 5/0476; B60J 4/0406; B60J 5/0408; B60J 5/0412
See application file for complete search history.

(56) References Cited

U.S. PATENT DOCUMENTS 5,867,942 A 2/1999 Kowalski
6,886,881 B1 5/2005 Henderson et al.
6,988,759 B2 1/2006 Fin et al.
7,634,873 B2 12/2009 Ruppert et al.
2003/0146648 A1* 8/2003 Lustig ............... B62D 25/10
296/190.11

FOREIGN PATENT DOCUMENTS

| CN | 2775254 Y | 4/2006 | |
|---|---|---|---|
| DE | 10237436 A1 * | 3/2004 | ............ B60J 5/0406 |
| DE | 10354097 A1 * | 6/2005 | ............ B60J 5/0406 |
| JP | S5970223 A | 4/1984 | |

OTHER PUBLICATIONS

English Machine Translation of CN2775254Y.
English Machine Translation of JPS5970223A.
English Machine Translation of JPH0225808B2.
"Early Ford Bronco Removable Soft Upper Doors"; YouTube; https://www.youtube.com/watch?v=foJizas1omg; Published Oct. 12, 2011.

* cited by examiner

*Primary Examiner* — Lori L Lyjak
(74) *Attorney, Agent, or Firm* — Jason Rogers; Vichit Chea; King & Schickli, PLLC (57) ABSTRACT

A convertible door assembly includes (a) an upper door section, defining a window opening, (b) a lower door section, (c) a releasable locking feature, retaining the upper door section to the lower door section, and (d) a window. The window is displaceable between a raised position, closing the window opening and a lowered position, concealed within an internal door cavity formed in the upper door section and the lower door section.

20 Claims, 14 Drawing Sheets

CONVERTIBLE DOOR ASSEMBLY FOR A MOTOR VEHICLE

TECHNICAL FIELD

This document relates generally to the motor vehicle equipment field and, more particularly, to a convertible door assembly having (a) a full-door configuration and (b) two different, abbreviated-door configurations allowing for open air motoring.

BACKGROUND

This document relates to a new and improved convertible door assembly having (a) a full-door configuration with a window that may be raised and lowered and (b) two different abbreviated-door configurations for beautiful days when an open air experience is desired. In the past, it has been necessary to provide a motor vehicle with two, interchangeable doors in order to provide door configurations of the type described. This convertible door assembly eliminates the need for two separate doors and thus represents a significant advance in the art.

SUMMARY

In accordance with the purposes and benefits described herein, a convertible door assembly is provided. That convertible door assembly comprises an upper door section defining a window opening, a lower door section, a releasable locking feature retaining the upper door section to the lower door section, and a window displaceable between a raised position, closing the window opening, and a lowered position concealed within an internal door cavity formed in the upper door section and the lower door section.

The upper door section may include a window receiver or slot through which the window slides when being displaced between the raised position and the lowered position. In addition the convertible door assembly may further include a regulator feature for displacing the window between the raised and lowered positions.

The convertible door assembly may further include a window coupler displaceable between a closed position engaging the window and an open position releasing the window. In addition, the convertible door assembly may include a biasing element biasing the window coupler toward the closed position. Still further, the convertible door assembly may also include a stop carried on the lower door section. The window coupler may engage the stop and thereby be displaced against the biasing element into the open position after the window has reached the raised position closing the window opening.

The window coupler of the convertible door assembly my further comprise a first jaw having a first leg and a second leg defining a first acute included angle and a second jaw having a third leg and a fourth leg defining a second acute included angle. The stop may include a first detent and a second detent. The first detent engages the second leg within the first acute included angle and the second detent engages the fourth leg within the second acute included angle in order to displace the window coupler into the open position releasing the window.

The regulator feature of the convertible door assembly may include a guideway and a drive motor and cable system for driving or displacing the window between the raised and lowered positions. The window coupler rides along that guideway as the window is displaced. The releasable locking feature may comprise a twist knob and a threaded fastener carried on the upper door section and a locking block carried on the lower door section.

The convertible door assembly may include a window retainer carried on the upper door section. The window retainer may be displaceable between a window engaging position whereby the window is locked in the raised position and a window releasing position whereby the window is free to be displaced between the raised position and the lowered position.

Still further, the window may include a window retainer receiver engaged by the window retainer when the window retainer is in the window engaging position. In addition the convertible door assembly may further include a second biasing element biasing the window retainer toward the window engaging position. Still further, a locking feature receiver may be provided in the window retainer. The twist knob may engage in the locking feature receiver and hold the window retainer in the window releasing position when the locking feature is locked to secure the upper door section to the lower door section.

The window retainer may further include a pull projecting from the upper door section. One may engage the pull and displace the window retainer from the window engaging position to the window releasing position. In addition, the convertible door assembly may further include a locator pin and a cooperating locator pin receiver. The locator pin may be carried on the upper door section and the locator pin receiver may be carried on the lower door section.

In some embodiments the convertible door assembly may further include a belt line wherein the belt line is defined by a first portion of the upper door section and a second portion of the lower door section when the upper door section and the lower door section are secured together. In such an embodiment a segment of the upper door section may extend below the belt line. Further, a part of the window may extend from a top of the lower door section when the window is in the lowered position and the upper door section has been removed.

In the following description, there are shown and described several preferred embodiments of the convertible door assembly. As it should be realized, the convertible door assembly is capable of other, different embodiments and its several details are capable of modification in various, obvious aspects all without departing from the convertible door assembly as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the convertible door assembly and together with the description serve to explain certain principles thereof.

Reference will now be made in detail to the present preferred embodiments of the convertible door assembly, examples of which are illustrated in the accompanying drawing figures.

DETAILED DESCRIPTION

Figure 1A:
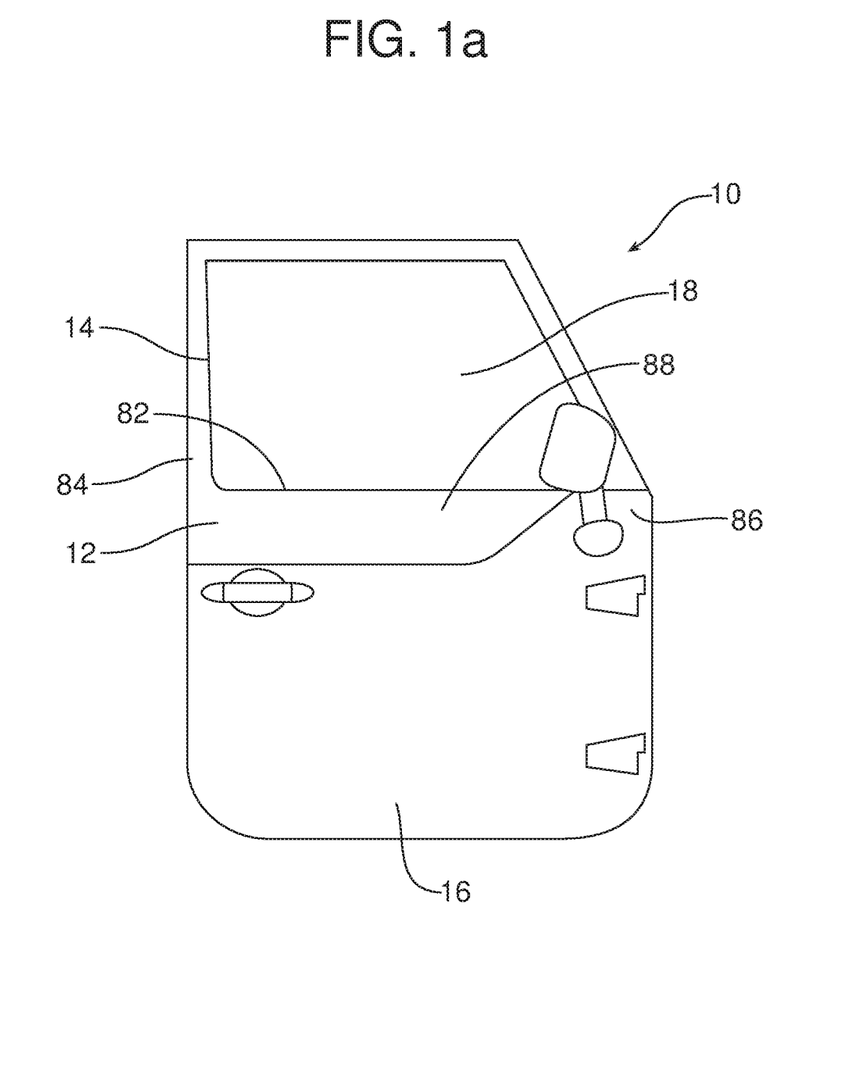
FIGS. 1a-1e are a series of views depicting the operation of the convertible door assembly when converting between a full-door configuration illustrated in FIG. 1a and a first abbreviated-door configuration illustrated in FIGS. 1c and 1d wherein the window is retained in the lower door section when the upper door section is moved.
Figure 1B:
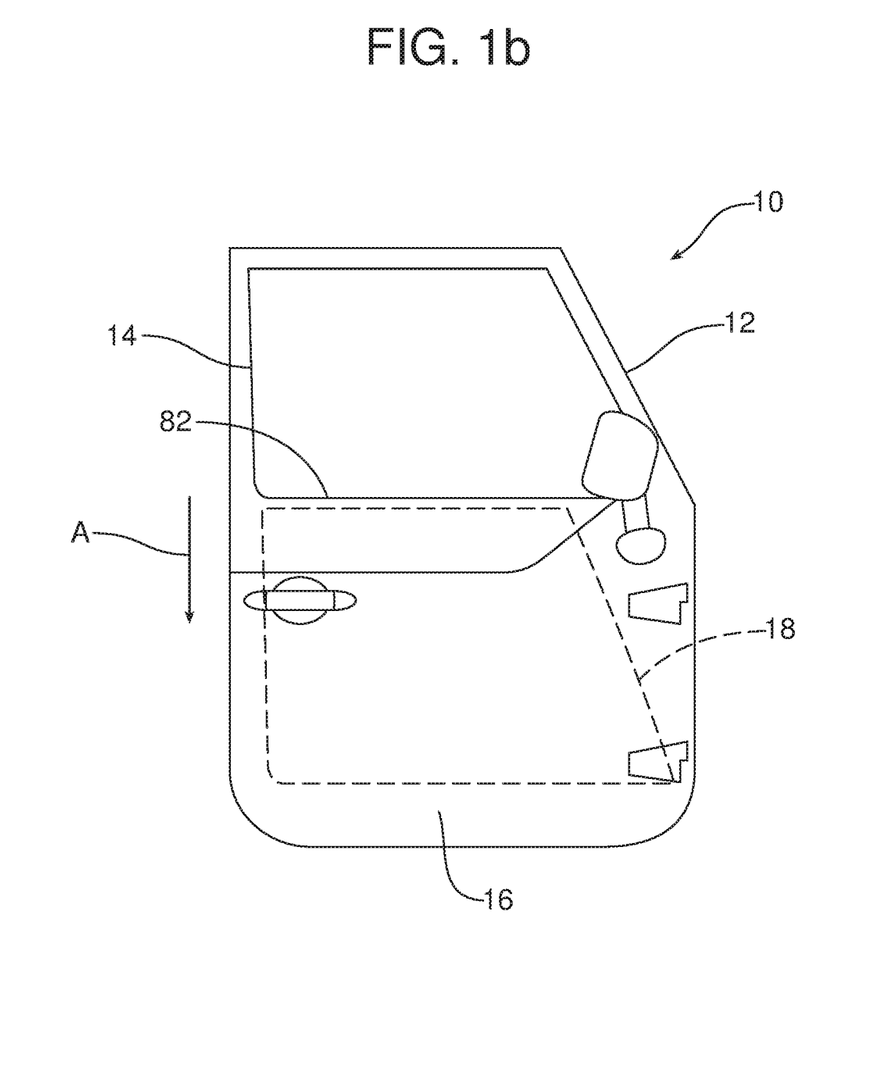
Figure 1C:
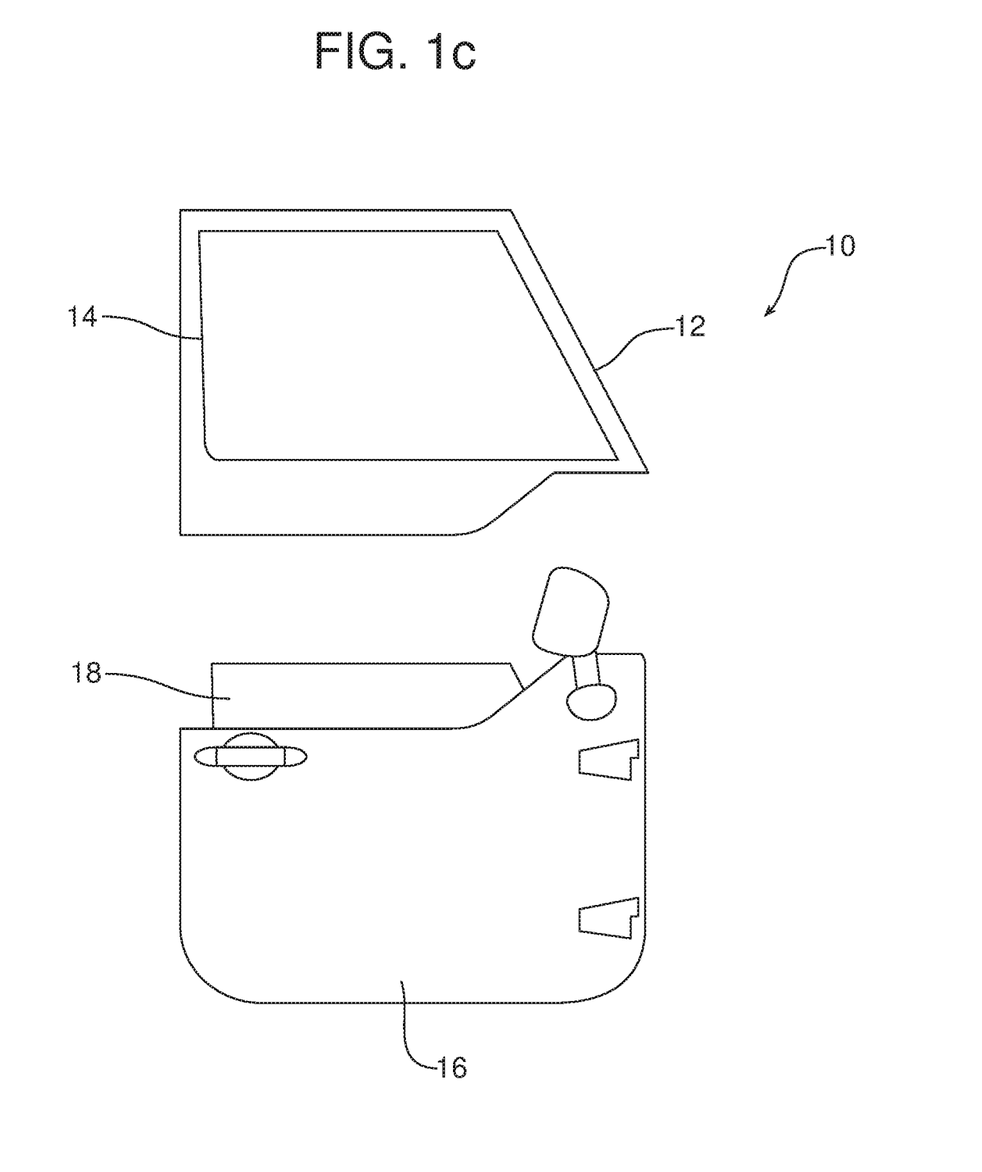
Figure 1D:
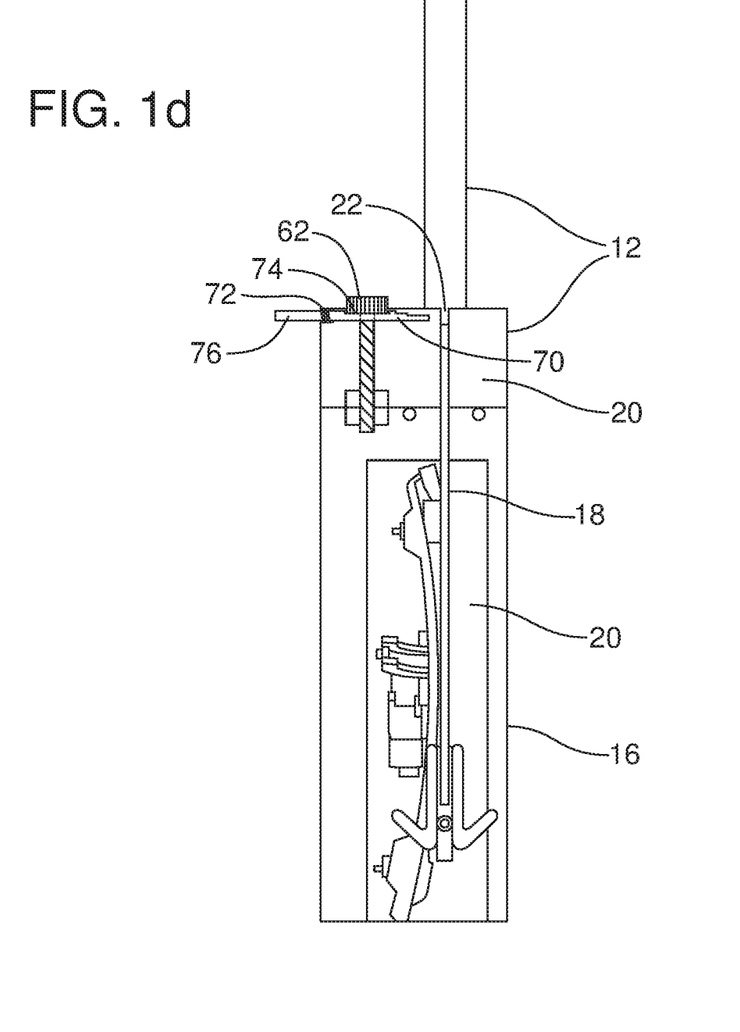

Reference is now made to FIGS. 1a-1d, 2a-2h and 3 which illustrate in detail the new and improved convertible door assembly 10. The convertible door assembly 10 includes an upper door section 12 which defines a window opening 14. The convertible door assembly 10 also includes a lower door section 16 and a window 18. The window 18 is displaceable between a raised position, closing the window opening 14 (see FIGS. 1a and 2a illustrating the full-door configuration with the window raised and closing the window opening) and a lowered position concealed within an internal door cavity 20 formed in the upper door section 12 and the lower door section 16. See, for example, FIGS. 1e and 2c.

Figure 3:
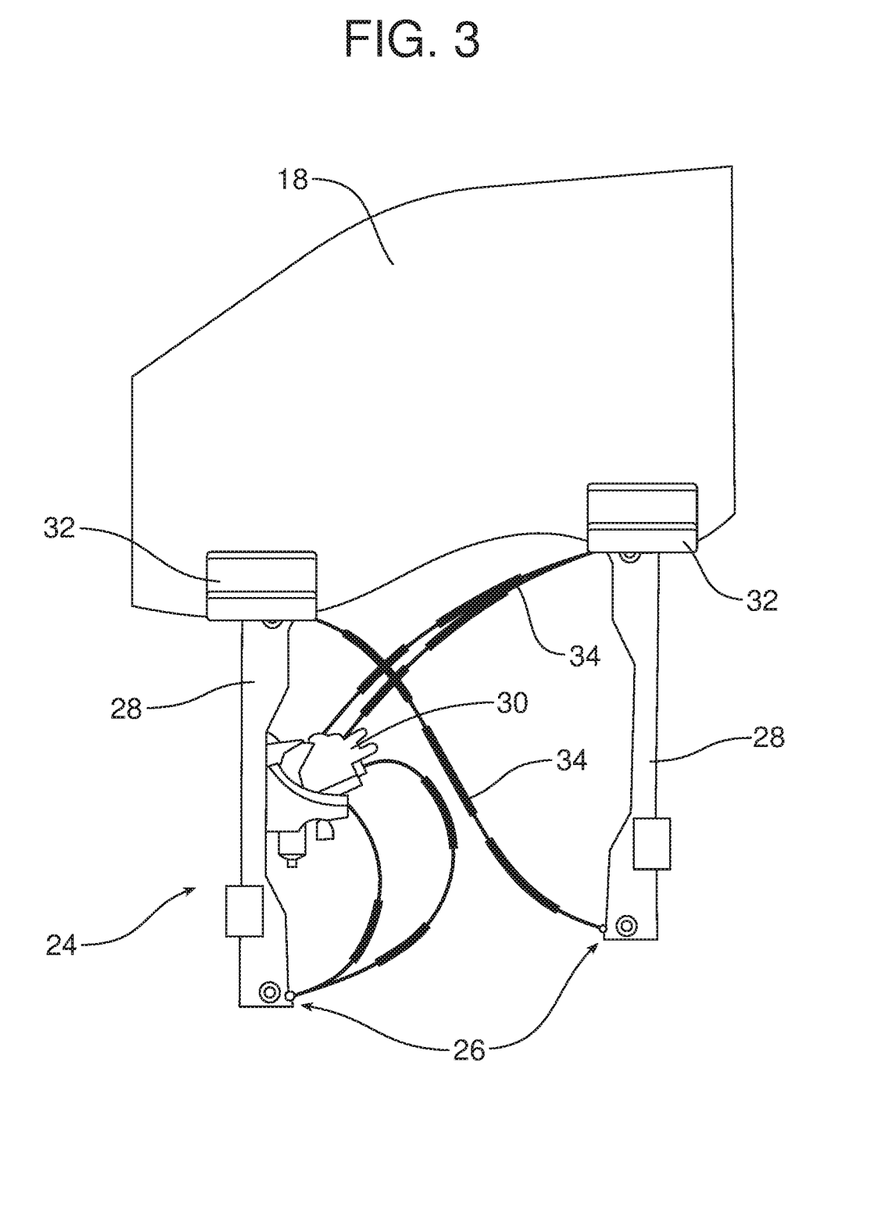
FIG. 3 is a schematic illustration of the displaceable window and the regulator feature for displacing the window between the raised and lowered positions.

As should be appreciated, the upper door section 12 includes a window receiver 22 or translation slot through which the window 18 slides when being displaced between the raised position and the lowered position. Toward this end, the convertible door assembly 10 may include a regulator feature 24 that displaces the window 18. As illustrated in FIG. 3, such a regulator feature 24 includes a guideway 26 in the form of twin rails 28 and a drive motor and cable system 30 that displaces the window 18 along the guideway 26/rails 28.

More specifically, two window couplers 32 slide along the guideway 26: one window coupler along each rail 28. The cables 34 of the drive motor and cable system 30 engage these couplers 32 to displace the couplers on the rails 28.

Figure 1E:
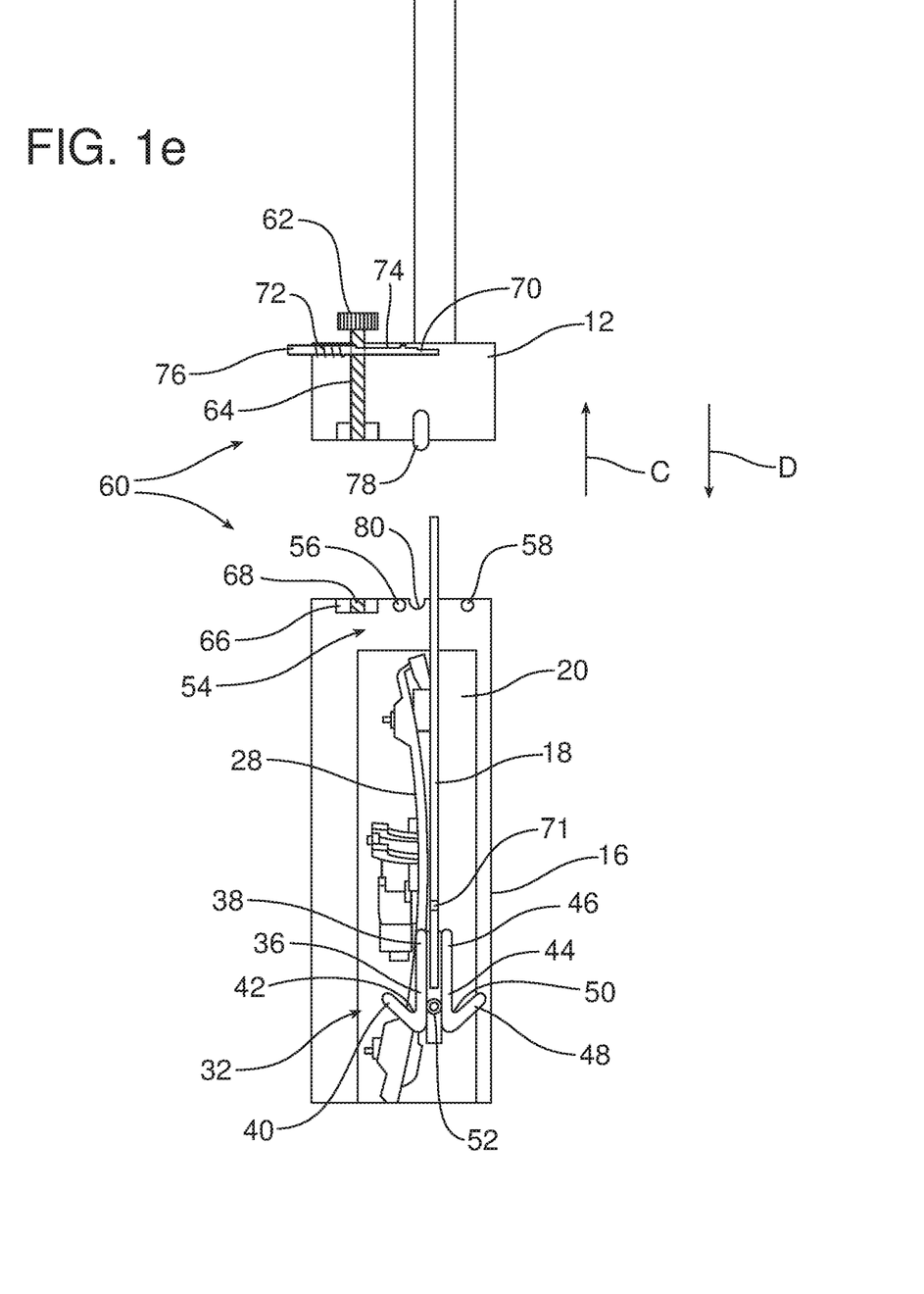
Figure 2A:
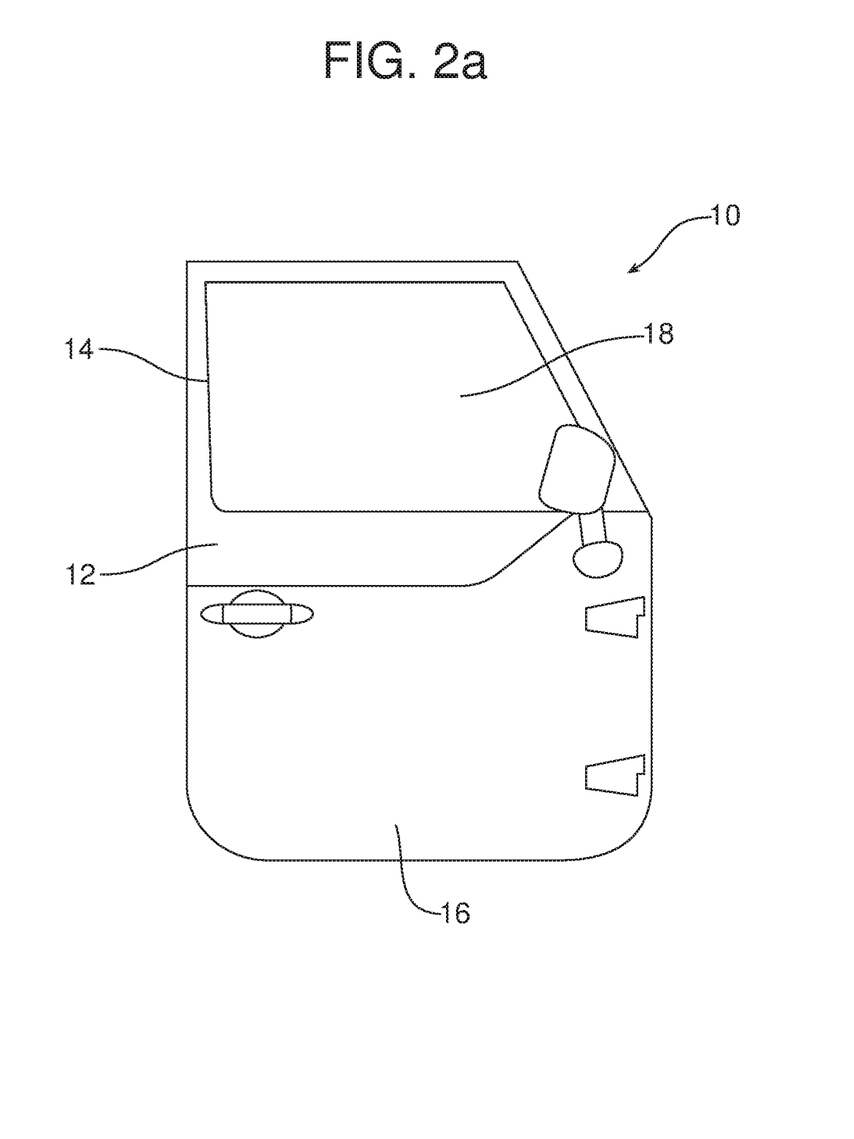
FIGS. 2a-2h are a series of views depicting operation of the convertible door assembly when converting that door assembly between the full-door configuration illustrated in FIG. 2a and a second abbreviated-door configuration illustrated in FIGS. 2b and 2h.

Each window coupler 32 comprises a first jaw 36, having a first leg 38 and a second leg 40 defining a first acute included angle 42 and a second jaw 44 having a third leg 46 and a fourth leg 48 defining a second acute included angle 50 (See, for example, FIG. 1e). As will be apparent from the following description, each window coupler 32 is displaceable between a closed position engaging the window 18 and an open position releasing the window. A first biasing element 52 biases the jaws 36, 44 of the window coupler 32 toward the closed position. In the illustrated embodiment, the biasing element 52 is a compressible pad or spring element provided between the first and second jaws 36, 44 adjacent to the point where the first leg 38 engages the second leg 40 and the third leg 46 engages the fourth leg 48.

A stop, generally designated by reference numeral 54, is carried on the lower door section 16. The stop 54 includes a first detent 56 and a second detent 58. Once the window 18 has reached the raised position, closing the window opening in a manner that will be described in greater detail below, the first detent 56 engages the second leg 40 within the first acute included angle 42 and the second detent 58 engages the fourth leg 48 within the second acute included angle 50. This action functions to displace the window coupler 32 and, more specifically, the jaws 36, 44 against the force of the biasing element 52 into an open position. (See FIGS. 2d-2g). This frees the window 18 from any connection with the regulator feature 24 and any other structure of the lower door section 16. This allows for removal of the window 18 with the upper door section 12 in a manner described in greater detail below.

The convertible door assembly 10 also includes a releasable locking feature, generally designated by reference numeral 60 that functions to retain the upper door section 12 to the lower door section 16. In the illustrated embodiment, the releasable locking feature 60 comprises (a) a twist knob 62 and integral threaded fastener 64 carried on the upper door section 12 and (b) a locking block 66 with a threaded aperture 68 carried on the lower door section 16. See, for example, FIGS. 1e and 2c-2g.

As illustrated in FIGS. 1d and 2c-2g, the convertible door assembly 10 may also include a window retainer 70 carried on the upper door section 12. The window retainer 70 is displaceable between (a) a window engaging position wherein the distal end of the window retainer 70 is received in a window retainer receiver or aperture 71 in the window 18, whereby the window 18 may be locked in the raised position and (b) a window releasing position wherein the window retainer is disengaged from the receiver in the window and the window is free to be displaced between the raised position and the lowered position. A second biasing element 72, in the form of a spring or the like, biases the window retainer toward the window engaging position.

As should also be appreciated, the window retainer 70 includes a locking feature receiver 74 such as a recess or cavity. The twist knob 62 of the releasable locking feature 60 engages in that locking feature receiver 74 and holds the window retainer 70 in the window releasing position when the releasable locking feature is locked to secure the upper door section 12 to the lower door section 16. A pull 76 in the form of a tab, ribbon or other structure projects from the proximal end of the window retainer 70 through an opening in the upper door section 12 so as to be accessible. One may engage the pull 76 to displace the window retainer 70 from the window engaging position to the window releasing position where the window retainer may be retained against the force of the second biasing element 72 by locking the releasable locking feature 60.

A locator pin 78 carried on the upper door section 12 and a cooperating locator pin receiver 80 carried on the lower door section 16 help one to properly align the upper door section 12 on the lower door section 16 when securing the two sections together. When the upper door section 12 and lower door section 16 are properly connected, a belt line 82 is defined by a first portion 84 of the upper door section and a second portion 86 of the lower door section. As best shown in FIGS. 1a-1b and 2a-2b a segment 88 of the upper door section 12 also extends below the belt line 82 when the upper door section 12 is connected to the lower door section 16.

Reference is now made to FIGS. 1a-1e which are a sequence of views illustrating how the convertible door assembly 10 is converted between a full-door configuration illustrated in FIG. 1a and a first abbreviated door configuration illustrated in FIGS. 1d and 1e.

First, the operator activates the regulator feature 24 in order to lower the window 18 through the window receiver 22 into the internal cavity 20 below the belt line 82 thereby opening the window opening 14. See action arrow A in FIG. 1b. Next the operator releases the releasable locking feature 60 by turning the twist knob 62 until the threaded fastener 64 is withdrawn from the threaded aperture 68 in the locking block 66 (note and compare FIGS. 1d and 1e). This frees the upper door section 12 for removal from the lower door section 16 allowing one to simply lift the upper door section 12 in order to remove it. Note action arrow C in FIG. 1e. As illustrated in FIG. 1e, when the upper door section 12 has been removed, the window 18 is retained in the lower door section 16 with the top of the window projecting above the upper edge of the lower door section. Significantly, the removal of the upper door section 12 opens the side of the motor vehicle for free air movement and a desired open air experience. See also FIG. 1c.

The upper door section 12 may be reconnected to the lower door section 16 in a quick and efficient manner when desired. More specifically, one aligns (a) the locator pin 78 on the upper door section 12 with the locator pin receiver 80 on the lower door section 16, (b) the threaded fastener 64 of the releasable locking feature 60 with the locking block 66 and (c) the upper portion of the window 18 with the upper portion of the internal cavity 20 formed in the upper door section 12. The upper door section 12 is then lowered down onto the lower door section 16 (note action arrow D in FIG. 1e) until the upper door section 12 is properly seated on the lower door section 16. One then turns the twist knob 62 to engage the threaded fastener 64 with the threaded aperture 68 in the locking block 66 thereby securing the upper door section 12 with the lower door section 16 as illustrated in FIG. 1b. One may then utilize the regulator feature 24 once again to raise the window 18 and close the window opening 14 thereby reestablishing the full-door configuration illustrated in FIG. 1a.

Figure 2B:
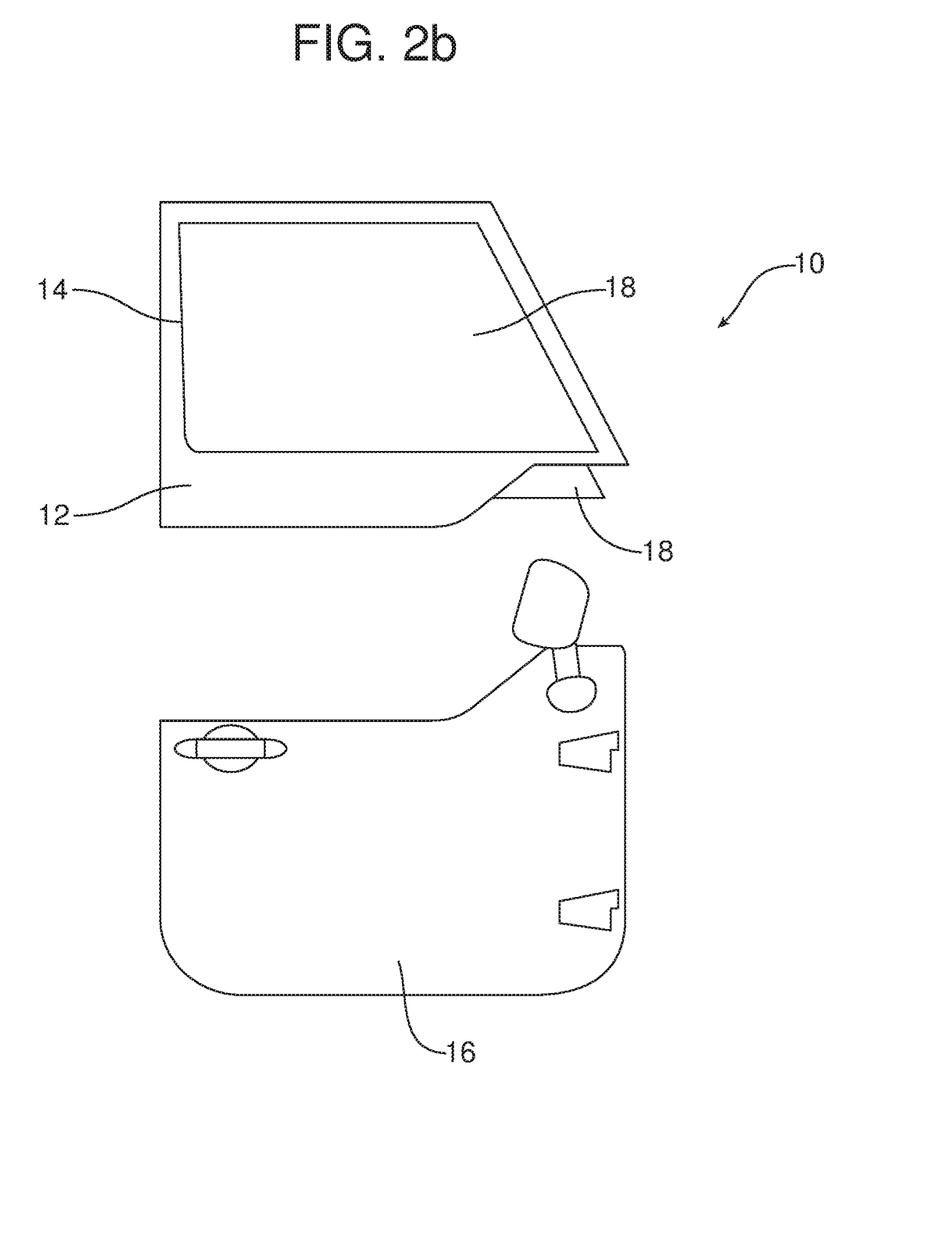
Figure 2C:
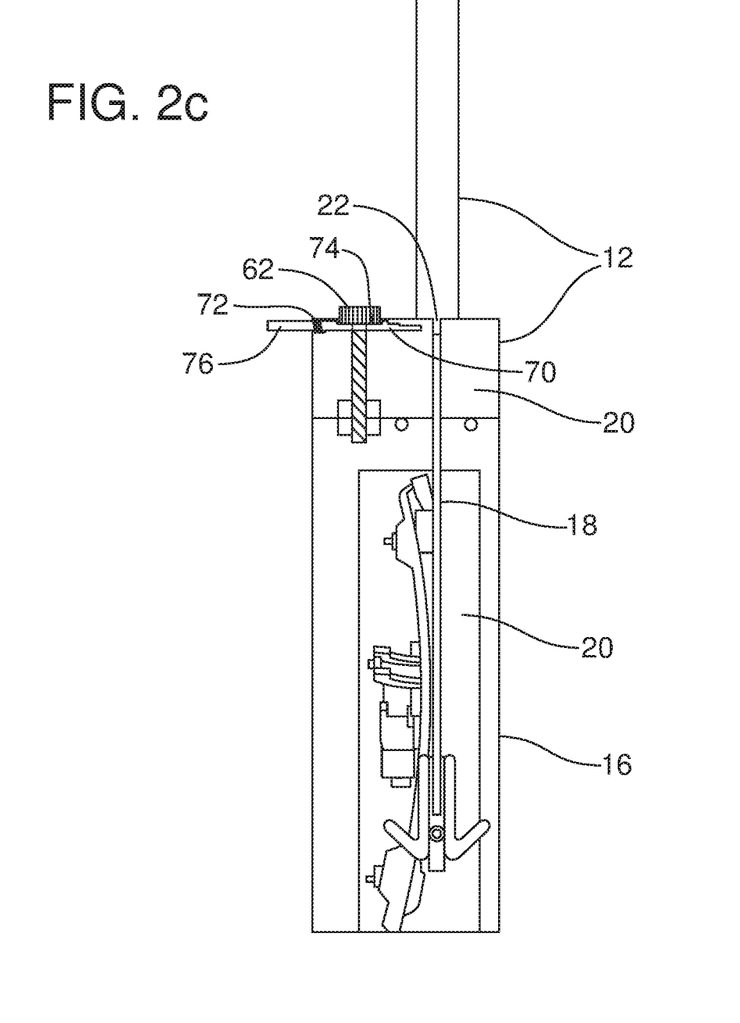
Figure 2D:
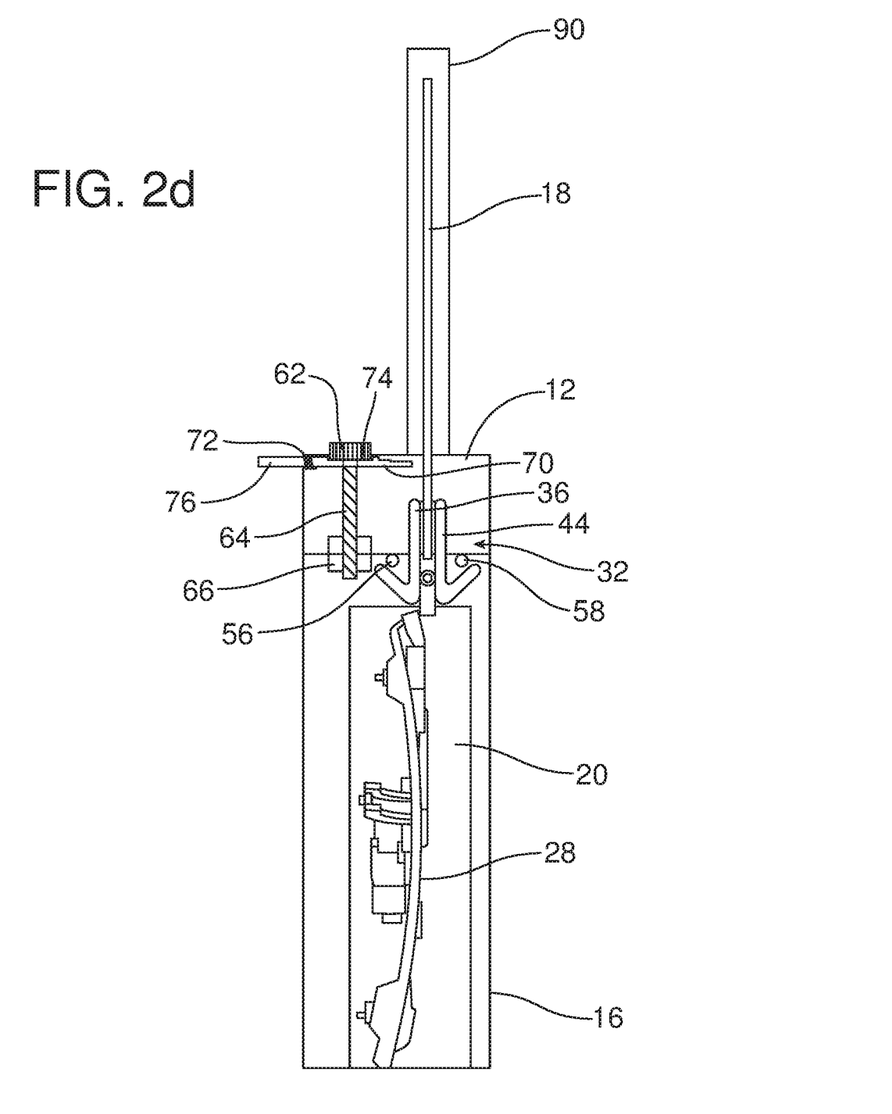
Figure 2E:
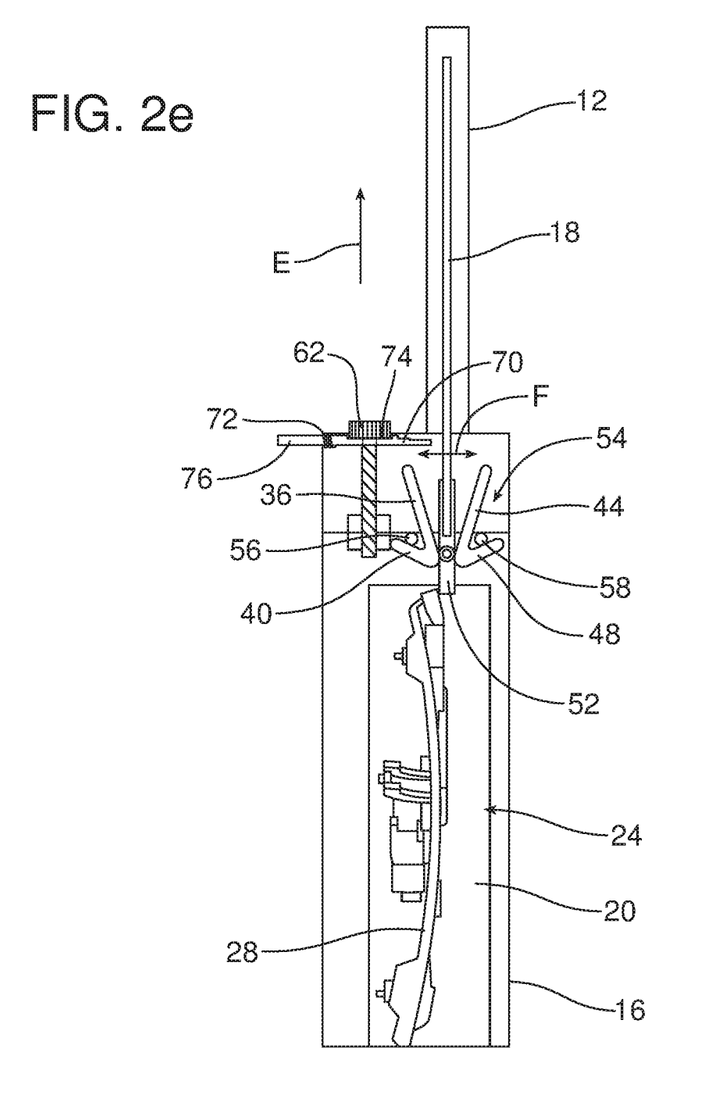
Figure 2F:
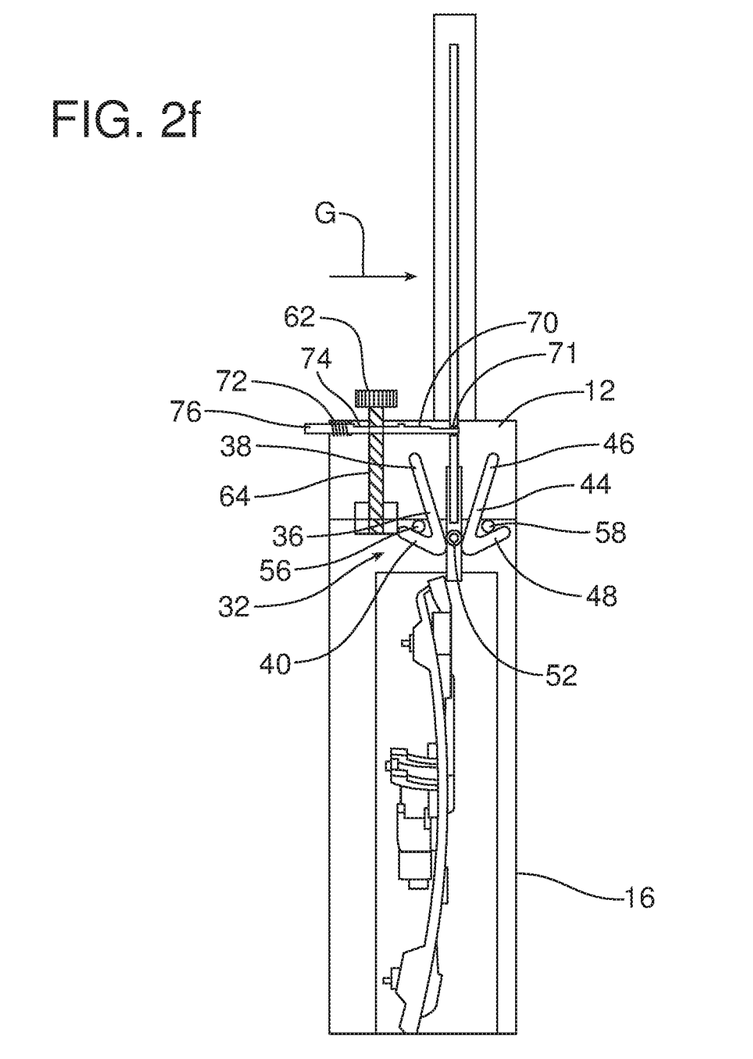
Figure 2G:
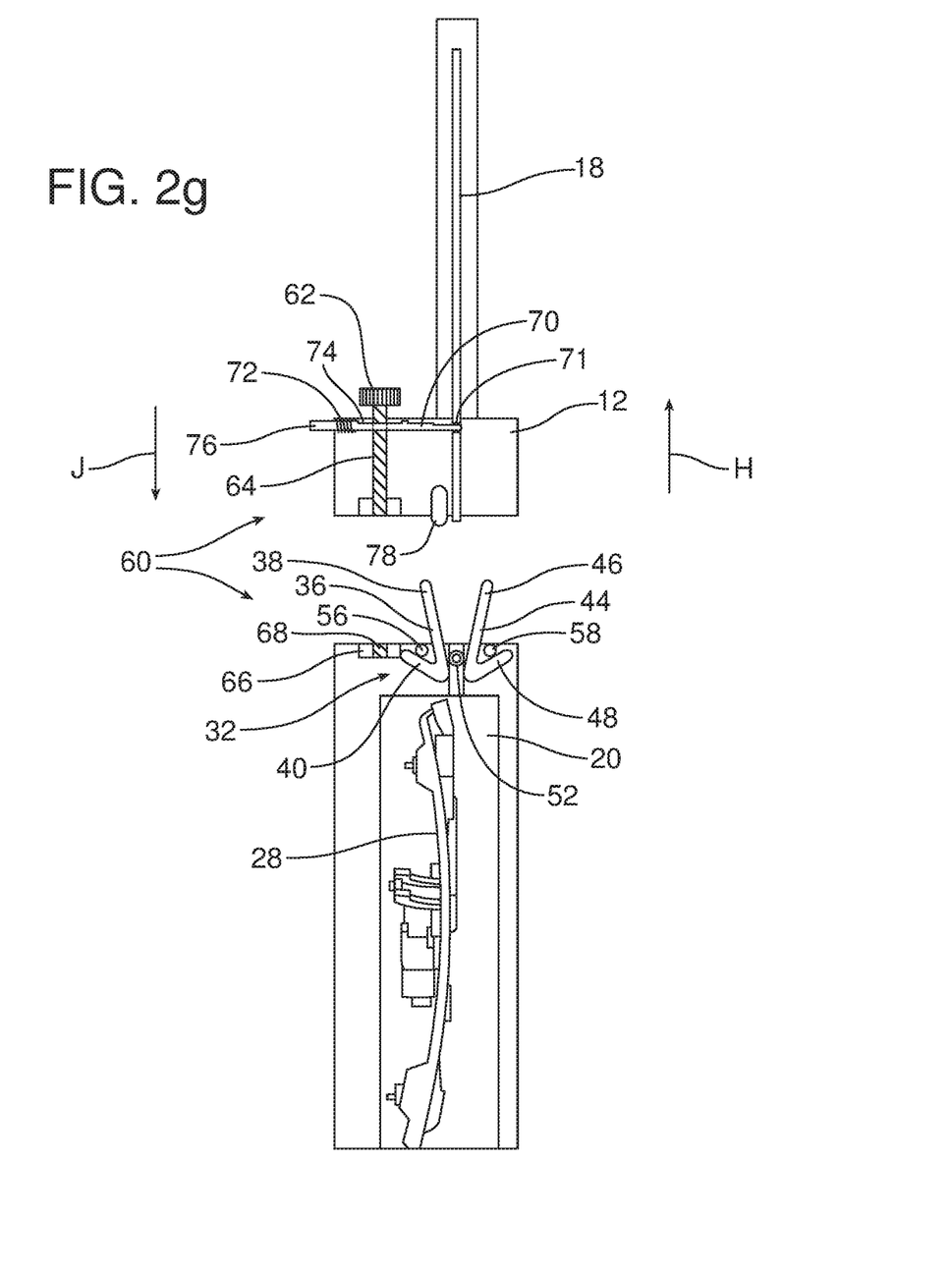
Figure 2H:
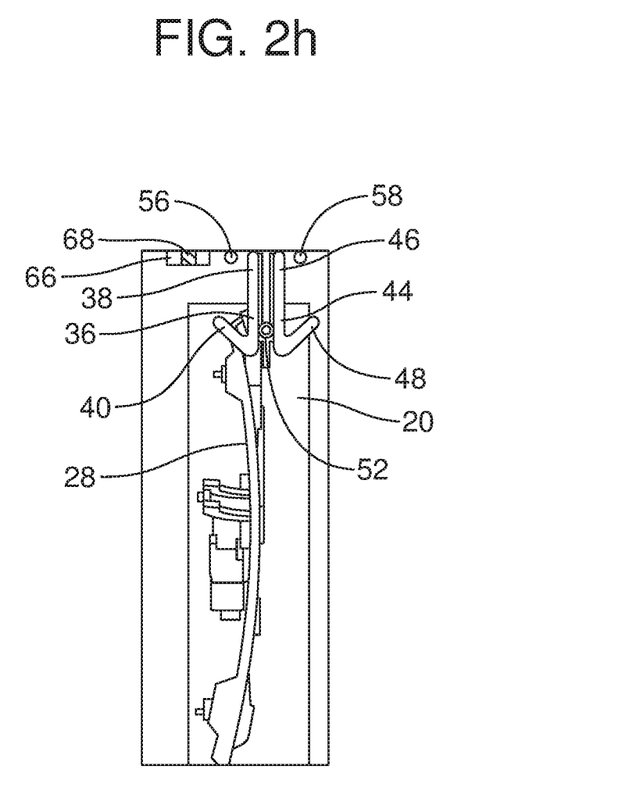

As illustrated in FIGS. 2a-2h, the convertible door assembly 10 may also be displaced between the full-door configuration illustrated in FIG. 2a and a second abbreviated-door configuration illustrated in FIGS. 2b and 2h wherein the window 18 is retained in the removed upper door section 12.

Toward this end, the window 18 is fully raised so as to close the window opening 14 in the upper door section 12 (see FIG. 2d) with the window 18 bottomed out with the top 90 of the window frame formed by the upper door section 12. The regulator feature 24 is activated to close the window for an additional period of time such as, for example, five seconds. This causes the first and second jaws 36, 44 of the window couplers 32 to be driven against the first and second detents 56, 58 of the stop 54. More specifically, as illustrated when comparing FIGS. 2d and 2e, note action arrow E, the first detent 56 engages the second leg 40 of the first jaw 36 at the first acute included angle 42 while the second detent 58 engages the fourth leg 48 of the second jaw 44 at the second acute included angle 50. This functions to force the jaws 36, 44 open (note action arrows F) against the force of the biasing element 52. Thus, as illustrated in FIG. 2e, the jaws 36, 44 and the window coupler 32 are disengaged from the window 18. This frees the window 18 from the regulator feature 24 held in the lower door section 16.

Next, one turns the twist knob 62 in order to withdraw the threaded fastener 64 from the threaded aperture 68 in the locking block 66 and release the releasable locking feature 60. As this is done, the twist knob 62 is displaced from the locking feature receiver 74 in the window retainer 70. This allows the second biasing element 72 to displace the window retainer 70 in the direction of action arrow G so that the distal end of the window retainer is engaged in the aperture or receiver 71 in the window 18 thereby securing the window in the raised position within the upper door section 12. Next, one lifts the upper door section 12 with the window 18, from the lower door section 16 (note action arrows H in FIG. 2g). One then activates the regulator feature 24 to lower the window couplers 32 back down into the internal cavity 20 in the lower door section 16. As this is done, the first and second jaws 36, 44 are disengaged from the first and second detents 56, 58 of the stop 54. The biasing element 52 then returns the jaws 36, 44 to the closed position, concealed within the internal cavity 20. As illustrated in FIG. 2b, in this second abbreviated-door configuration the open air experience is maximized as the window 18 has been removed from the lower door section 16.

One may easily restore the convertible door assembly 10 to the full-door configuration illustrated in FIG. 2a by first activating the regulator feature 24 to raise the window couplers 32 against the stop 54 to open the jaws 36, 44. As illustrated in FIG. 2g, those jaws 36, 44 project from the top of the lower door section 16 when opened. Next one aligns (a) the locator pin 78 on the upper door section 12 with the locator pin receiver 80 on the lower door section 16, (b) the threaded fastener 64 with the threaded aperture 68 in the locking block 66 and (c) the window 18 with the open jaws 36, 44 of the window couplers 32. The upper door section 12 is then lowered onto the lower door section 16. Note action arrow J in FIG. 2g.

Next, one engages the pull 76 and withdraws the distal end of the window retainer 70 from the aperture or receiver 71 in the window 18. While holding the window retainer 70 in this position with the pull 76, one turns the twist knob 62 until the threaded fastener 64 is fully seated in the threaded aperture 68 of the locking block 66. Simultaneously, the twist knob 62 is fully seated in the receiver 74 in the window retainer 70 thereby securing the window retainer in the window releasing position against the force of the biasing element 72. See FIG. 2e. Next, one activates the regulator feature 24 to lower the window 18. As this is initially done, the window coupler 32 is displaced downward away from the stop 54 thereby disengaging the detents 56, 58 from the jaws 36, 44 and causing those jaws/the window couplers to engage the window 18. (See FIG. 2d.) If one were to continue to activate the regulator feature 24, the window 18 could once again be lowered fully into the internal cavity 20 where the window is fully concealed by the upper door section 12 and the lower door section 16. Alternatively, if one desires, the window 18 may be maintained in the raised position closing the window opening 14 in the upper door section 12 (see FIG. 2a).

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A convertible door assembly, comprising:
   an upper door section defining a window opening;
   a lower door section;
   a releasable locking feature retaining said upper door section to said lower door section; and
   a window displaceable between a raised position, closing said window opening, and a lowered position concealed within an internal door cavity formed in said upper door section and said lower door section.

2. The convertible door assembly of claim 1 wherein said upper door section includes a window receiver through which said window slides when being displaced between said raised position and said lowered position.

3. The convertible door assembly of claim 2, further including a regulator feature displacing said window between said raised position and said lowered position.

4. The convertible door assembly of claim 3, further including a window coupler displaceable between a closed position engaging said window and an open position releasing said window.

5. The convertible door assembly of claim 4, further including a first biasing element biasing said window coupler toward said closed position.

6. The convertible door assembly of claim 5, further including a stop carried on said lower door section, said window coupler engaging said stop and being displaced against said first biasing element into said open position after said window has reached said raised position closing said window opening.

7. The convertible door assembly of claim 6, wherein said window coupler comprises a first jaw having a first leg and a second leg defining a first acute included angle and a second jaw having a third leg and a fourth leg defining a second acute included angle.

8. The convertible door assembly of claim 7, wherein said stop includes a first detent and a second detent, said first detent engaging said second leg within said first acute included angle and said second detent engaging said fourth leg within said second acute included angle.

9. The convertible door assembly of claim 8, wherein said regulator feature includes a guideway and a drive motor and cable system.

10. The convertible door assembly of claim 9, wherein said window coupler rides along said guideway as said window is displaced between said raised position and said lowered position.

11. The convertible door assembly of claim 10, wherein said releasable locking feature comprises a twist knob and a threaded fastener carried on said upper door section and a locking block carried on said lower door section.

12. The convertible door assembly of claim 11, further including a window retainer carried on said upper door section, said window retainer displaceable between a window engaging position, whereby said window is locked in said raised position, and a window releasing position whereby said window is free to be displaced between said raised position and said lowered position.

13. The convertible door assembly of claim 12, wherein said window includes a window retainer receiver engaged by said window retainer when said window retainer is in said window engaging position.

14. The convertible door assembly of claim 13, further including a second biasing element biasing said window retainer toward said window engaging position.

15. The convertible door assembly of claim 14, further including a locking feature receiver in said window retainer, said twist knob engaging in said locking feature receiver and holding said window retainer in said window releasing position when said locking feature is locked to secure said upper door section to said lower door section.

16. The convertible door assembly of claim 15, wherein said window retainer further includes a pull projecting from said upper door section whereby one may engage said pull and displace said window retainer from said window engaging position to said window releasing position.

17. The convertible door assembly of claim 16, further including a locator pin and a cooperating locator pin receiver, said locator pin being carried on said upper door section and said locator pin receiver being carried on said lower door section.

18. The convertible door assembly of claim 1, further including a belt line, said belt line being defined by a first portion of said upper door section and a second portion of said lower door section when said upper door section and said lower door section are secured together.

19. The convertible door assembly of claim 18, wherein a segment of said upper door section extends below said belt line.

20. The convertible door assembly of claim 1, wherein a part of said window extends from a top of said lower door section when in said lowered position.

\* \* \* \* \*